United States Patent
Eleftheriadis et al.

(10) Patent No.: US 12,538,338 B2
(45) Date of Patent: Jan. 27, 2026

(54) SCHEDULING COMMUNICATION OF A WIRELESS COMMUNICATION DEVICE IN A COMMUNICATIONS NETWORK

(71) Applicant: Telefonaktiebolaget LM Ericsson (publ), Stockholm (SE)

(72) Inventors: Lackis Eleftheriadis, Valbo (SE); Swarup Kumar Mohalik, Bangalore (IN); Athanasios Karapantelakis, Solna (SE); Rafia Inam, Västerås (SE); Ajay Kattepur, Bangalore (IN); Yifei Jin, Solna (SE); Aneta Vulgarakis Feljan, Stockholm (SE); Marin Orlic, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 305 days.

(21) Appl. No.: 18/025,802

(22) PCT Filed: Sep. 21, 2020

(86) PCT No.: PCT/SE2020/050881
§ 371 (c)(1),
(2) Date: Mar. 10, 2023

(87) PCT Pub. No.: WO2022/066067
PCT Pub. Date: Mar. 31, 2022

(65) Prior Publication Data
US 2023/0337263 A1 Oct. 19, 2023

(51) Int. Cl.
*H04W 40/18* (2009.01)
*H04W 36/32* (2009.01)
(Continued)

(52) U.S. Cl.
CPC ......... *H04W 72/51* (2023.01); *H04W 36/322* (2023.05); *H04W 72/12* (2013.01); *H04W 72/543* (2023.01)

(58) Field of Classification Search
CPC ..... H04W 40/10; H04W 40/18; H04W 40/20; H04W 24/04; H04W 36/322; H04W 72/12
(Continued)

(56) References Cited

U.S. PATENT DOCUMENTS

| | | | |
|---|---|---|---|
| 7,269,151 B2 * | 9/2007 | Diener | H04L 1/1664 370/329 |
| 8,810,192 B2 * | 8/2014 | Bridges | G06Q 30/0202 705/72 |

(Continued)

FOREIGN PATENT DOCUMENTS

| | | |
|---|---|---|
| EP | 3203188 A | 8/2017 |
| WO | 2019232746 A1 | 12/2019 |

OTHER PUBLICATIONS

International Search Report and Written Opinion of the International Searching Authority, PCT/SE2020/050881, mailed May 28, 2021, 12 pages.

(Continued)

*Primary Examiner* — John Pezzlo
(74) *Attorney, Agent, or Firm* — Sage Patent Group

(57) ABSTRACT

The present disclosure relates to a method of scheduling communication of a wireless communication device in a communications network, and a device performing the method. A method of a device of scheduling communication of a wireless communication device in a communications network is provided. The method includes determining a geographical path along which the wireless communication device is expected to travel, acquiring data indicating power availability of access points via which the wireless commu- (Continued)

nication device is capable of communicating along the expected geographical path, determining, from the acquired data indicating power availability, via which of the access points communication is to be established along the expected geographical path for avoiding establishing communication with one or more of the access points indicated to be subjected to power failure, and scheduling the communication to occur via the determined access points.

16 Claims, 4 Drawing Sheets

(51) Int. Cl.
    *H04W 72/12* (2023.01)
    *H04W 72/51* (2023.01)
    *H04W 72/543* (2023.01)

(58) Field of Classification Search
    USPC .................. 370/217, 242, 252, 329, 216
    See application file for complete search history.

(56) References Cited

U.S. PATENT DOCUMENTS

| | | | |
|---|---|---|---|
| 9,986,577 B2* | 5/2018 | Bose | H04W 52/34 |
| 10,721,162 B2* | 7/2020 | Jagannath | H04W 40/10 |
| 2015/0264644 A1 | 9/2015 | Kamijoh et al. | |
| 2016/0037379 A1 | 2/2016 | Shafiee et al. | |
| 2016/0043814 A1* | 2/2016 | Bishop | H04L 43/06 |
| | | | 370/242 |
| 2018/0054490 A1* | 2/2018 | Wadhwa | G08G 1/0129 |
| 2018/0262991 A1 | 9/2018 | Rao et al. | |
| 2019/0268786 A1 | 8/2019 | Fischer | |
| 2019/0280966 A1* | 9/2019 | Jagannath | H04W 40/10 |
| 2019/0364433 A1* | 11/2019 | Das | G06N 5/045 |
| 2020/0339150 A1* | 10/2020 | Olsson | B60W 10/184 |
| 2021/0294826 A1* | 9/2021 | Chen | H04L 51/234 |
| 2023/0095067 A1* | 3/2023 | Peng | H04W 76/14 |
| | | | 370/310 |
| 2023/0189382 A1* | 6/2023 | Haustein | H04W 76/20 |
| | | | 370/329 |

OTHER PUBLICATIONS

3GPP TS 22.104 v17.3.0 (Jul. 2020); 3rd Generation Partnership Project; Technical Specification Group Services and System Aspects; Service requirements for cyber-physical control applications in vertical domains; Stage 1 (Release 17); 76 pages.

3GPP TS 22.261 v17.3.0 (Jul. 2020-07); 3rd Generation Partnership Project; Technical Specification Group Services and System Aspects; Service requirements for the 5G system; Stage 1 (Release 17); 83 pages.

3GPP TR 28.801 v15.1.0 (Jan. 2018); 3rd Generation Partnership Project; Technical Specification Group Services and System Aspects; Telecommunication management; Study on management and orchestration of network slicing for next generation network (Release 15); 75 pages.

* cited by examiner

SCHEDULING COMMUNICATION OF A WIRELESS COMMUNICATION DEVICE IN A COMMUNICATIONS NETWORK

CROSS REFERENCE TO RELATED APPLICATIONS

This application is a 35 U.S.C. § 371 national stage application of PCT International Application No. PCT/SE2020/050881 filed on Sep. 22, 2020, the disclosure and content of which is incorporated by reference herein in its entirety.

TECHNICAL FIELD

The present disclosure relates to a method of scheduling communication of a wireless communication device in a communications network, and a device performing the method.

BACKGROUND

In today's wireless communications systems, such as 3rd Generation Partnership Project (3GPP) data- and telecommunications systems, power failure is a major problem in many parts of the world.

This is mainly due to unstable power grids causing power outage in various devices of the wireless communications systems, such as for instance routers, radio base stations, radio units, etc.

This in its turn causes communication failure for wireless communication devices establishing communication channels via for instance a radio base station. These wireless communication devices can be found in many different fields such as automotive, Internet-of-Things (IoT), robotics, medical applications, etc.

In other words, if a wireless communication device such as a smart phone communicates via a network device—e.g. a radio base station—suffering from power failure, it is likely that the smart phone will not be able to establish a communication channel via the radio base station.

SUMMARY

One objective is to solve, or at least mitigate, this problem in the art and thus to provide an improved method of scheduling communication of a wireless communication device in a communications network.

In a first aspect, a method of a device of scheduling communication of a wireless communication device in a communications network is provided. The method comprises determining a geographical path along which the wireless communication device is expected to travel, acquiring data indicating power availability of access points via which the wireless communication device is capable of communicating along the expected geographical path, determining, from the acquired data indicating power availability, via which of the access points communication is to be established along the expected geographical path for avoiding establishing communication with one or more of the access points indicated to be subjected to power failure, and scheduling the communication to occur via the determined access points.

In a second aspect, a device configured to schedule communication of a wireless communication device in a communications network is provided. The device comprises a processing unit and a memory, said memory containing instructions executable by the processing unit, whereby the device is operative to determine a geographical path along which the wireless communication device is expected to travel, acquire data indicating power availability of access points via which the wireless communication device is capable of communicating along the expected geographical path, determine, from the acquired data indicating power availability, via which of the access points communication is to be established along the expected geographical path for avoiding establishing communication with one or more of the access points indicated to be subjected to power failure, and to schedule the communication to occur via the determined access points.

Advantageously, by taking into account power availability data for access points, e.g. radio base stations, it is possible to schedule communication of a wireless communication device as the wireless communication device travels along a path being served by the access points such that the communication is not established with an access point where the acquired power availability data indicates that there is a risk that the access point will experience a power failure.

In an embodiment, the scheduling is performed such that the wireless communication device is scheduled to establish connection with one of the access points which currently is not subjected to power failure, the wireless communication device being rescheduled from said one of the access points to another of the access points in case a power failure is approaching for said one of the access points.

In an embodiment, the acquired data constituting historical data indicating power availability of the access points over time.

In an embodiment, the historical data indicates power availability comprising an expected power outage schedule of the access points over time.

In an embodiment, the method further comprises computing, based on the acquired data indicating power availability of the access points, a measure reflecting the power availability over time for each access point.

In an embodiment, the determining via which of the access points communication is to be established comprises determining whether or not one or more of the computed measures exceed a threshold value indicating a sufficiently high power availability, and if so the scheduling comprises scheduling the communication to occur via anyone of the access points having a computed measure exceeding the threshold value.

In an embodiment, the method further comprises, in case selection is to be made between two or more access points not being subjected to power failure, acquiring data indicating quality of service provided by said two or more access points, determining from the acquired data indicating quality of service which one of said two or more access points is indicated to provide a highest quality of service, and scheduling the communication to occur via the determined access point indicated to provide a highest quality of service.

In an embodiment, the method further comprises, in case a stipulated service level requirement is indicated to not be complied with by one or more of the determined access points via which communication is scheduled to occur, reconfiguring said one or more of the determined access points such that the stipulated service level requirement is complied with.

In an embodiment, the determining and scheduling is performed using machine learning.

In a third aspect, a computer program is provided comprising computer-executable instructions for causing a device of the second aspect to perform steps recited in the method of the first aspect when the computer-executable instructions are executed on a processing unit included in the device.

In a fourth aspect, a computer program product is provided comprising a computer readable medium, the computer readable medium having the computer program according to the third aspect embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
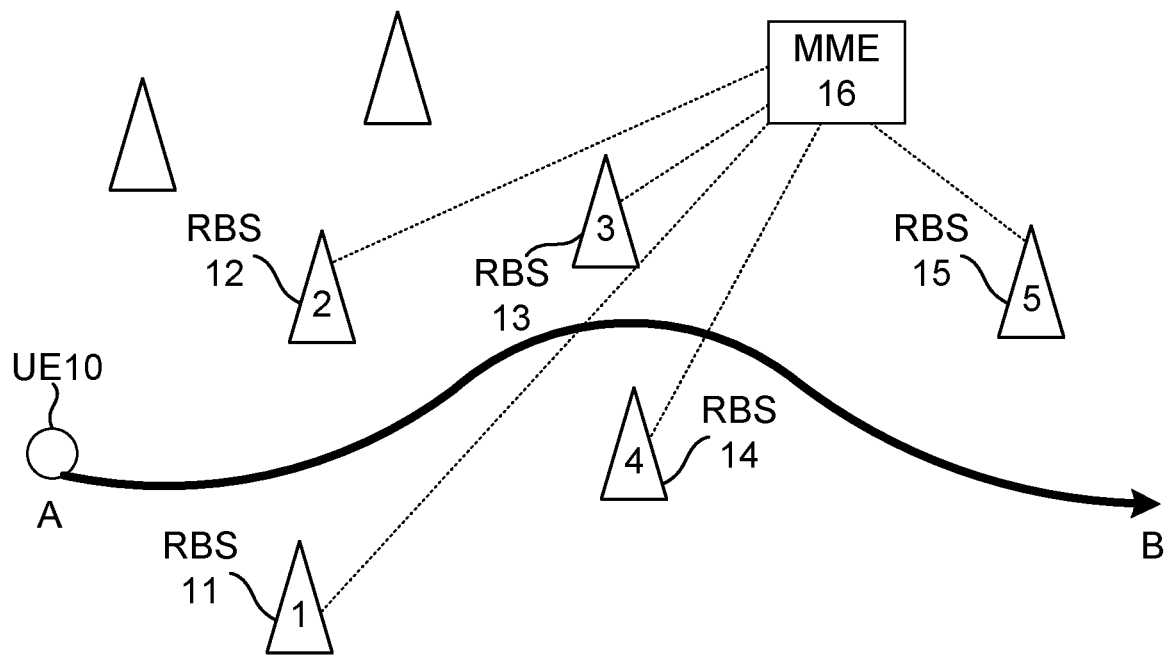
FIG. 1 illustrates a wireless communication device travelling along a path passing via a plurality of radio base stations with which the wireless communication device will establish communication channels.

FIG. 1 illustrates a wireless communication device 10 such as a smart phone, commonly referred to as a User Equipment (UE) located in a vehicle such as a car travelling along a geographical path from A to B, thereby passing via five access points in the form of e.g. radio base stations (RBSs) 11-15 via which the smart phone 10 will establish communication channels for communication. It is noted that the UE may be embodied by any appropriate device with wireless connectivity, such as a smart phone, tablet, robot, unmanned aerial vehicle (UAV), or even the vehicle itself of FIG. 1 being for instance a connected car.

A problem in the art is that upon the UE 10 for instance approaching third RBS 13 and fourth RBS 14, a selection is to be made via which one of the third and fourth RBS 13, 14 communication should be established. This may be determined by the UE itself or by a core network control device such as for instance a Mobility Management Entity 16 (MME).

Now, assuming that at the time the UE 10 approaches the third and the fourth RBS 13, 14, the UE 10 establishes communication with the third RBS 13 which shortly thereafter suffers from power failure due to a faulty power grid supplying the third RBS 13 with operational power; the established communication channel between the UE 10 end the third RBS 13 will consequently be discontinued and a communication failure will occur for the UE 10.

This may possibly be mitigated by equipping the third RBS 13 with a backup battery for temporarily providing the third RBS 13 with power in case of grid power outage. However, this spare power may not last long enough to supply the third RBS 13 with sufficient power to avoid power failure, in which case UE communication failure nevertheless will occur.

Assuming that during this time, the fourth RBS 14 does not suffer from a power failure; in retrospect it would thus have been preferred that the UE 10 established communication with the fourth RBS 14 instead of with the third RBS 13.

Figure 2:
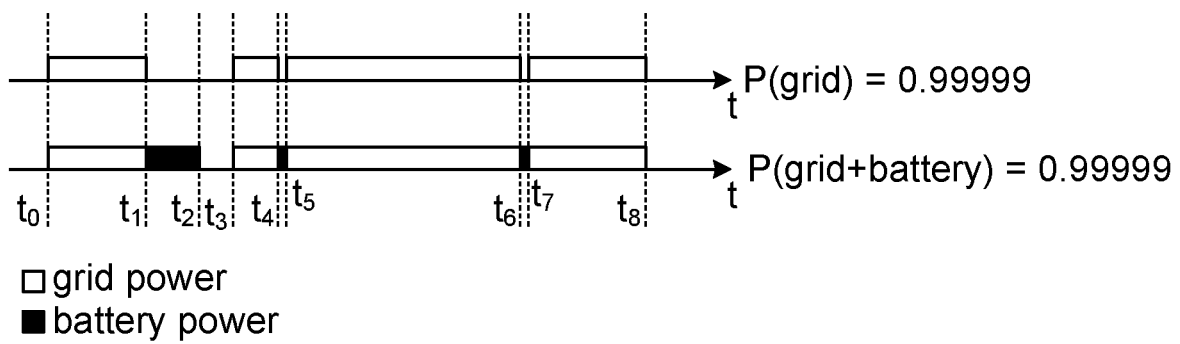
FIG. 2 illustrates power availability of a radio base station over time.

FIG. 2 illustrates in more detail the power availability of the third RBS 13. In this example, it is assumed in the upper illustration of FIG. 2 that the third RBS 13 is adequately powered by the grid from $t_0$ to $t_1$, at which point in time a power failure occurs which is remedied at $t_3$. A further short power failure occurs between $t_4$ and $t_5$, and the RBS 13 is subjected to yet another short power failure between $t_6$ and $t_7$.

In this example, it is illustrated that the probability—P (grid)—that the power grid is capable of delivering an adequate amount of power to the third RBS 13 over time is P(grid)=0.9999.

It is further assumed, as illustrated in the lower illustration of FIG. 2, that the third RBS 13 is equipped with a backup battery capable of temporarily powering the third RBS 13 in case of grid failure. Thus, with the backup battery, the third RBS 13 experiences a power failure only between $t_2$ and $t_3$ and the probability—P(grid+battery)—that the power grid supplemented with the backup battery is capable of delivering an adequate amount of power to the third RBS 13 over time is P(grid+battery)=0.99999, i.e. somewhat higher than without the backup battery.

To overcome, or at least mitigate, the problem of RBS power failure, a method of scheduling data communication of the UE 10 in the communication network is proposed.

Figure 3:
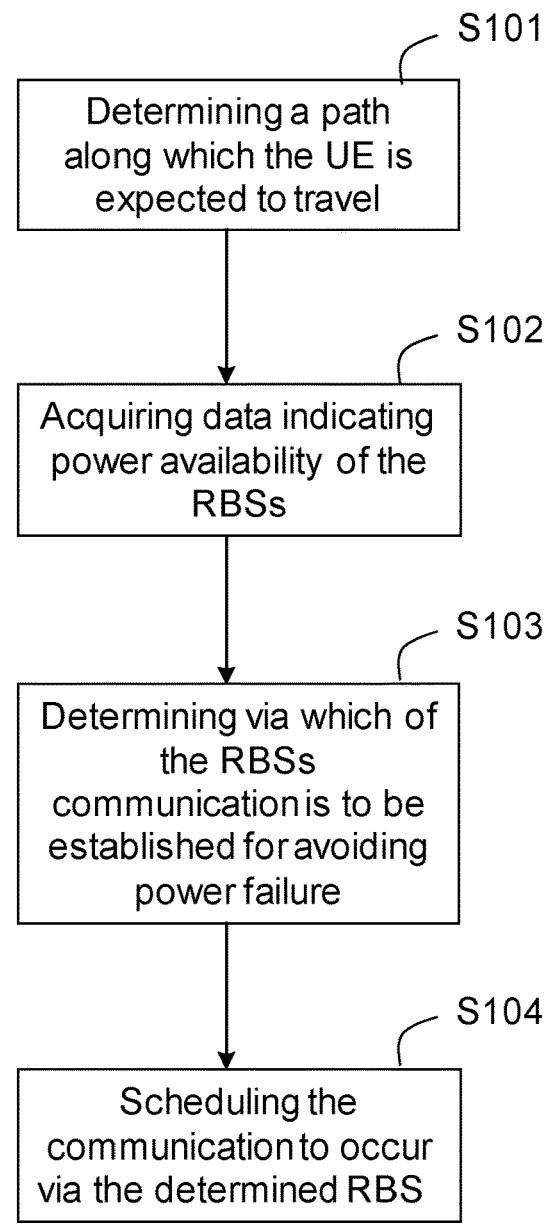
FIG. 3 shows a flowchart illustrating a method of scheduling communication of a wireless communication device in a communications network according to an embodiment.

FIG. 3 shows a flowchart illustrating the method according to an embodiment. The method may for instance be performed by the UE 10 or a core network device such as the previously mentioned MME 16. In the following, the method will be illustrated to be performed by the MME 16.

Figure 4:
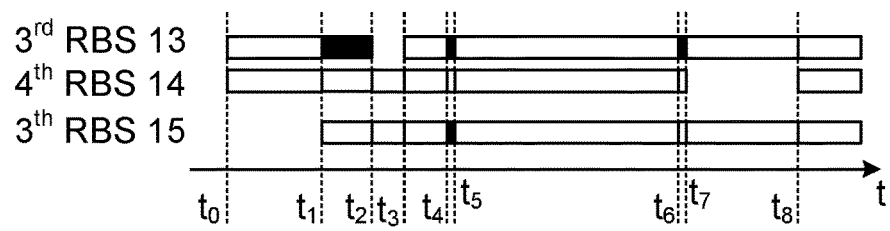
FIG. 4 illustrates power availability of a plurality of radio base stations over time.

Reference will further be made to FIG. 4 illustrating historical power availability of the third RBS 13, fourth RBS 14 and fifth RBS 15 over time.

To overcome the above-mentioned problem, the MME 16 will in step S101 determine the path along which the car and thus the UE 10 is expected to travel. This may be performed in cooperation with a map application the UE 10, such as e.g.

Google Maps, or a trip computer of the car 10. It may be envisaged that a user of the UE 10 or a driver of the car enters the expected path from A to B into the UE or the trip computer, which path data subsequently is transmitted to the MME 16 via second RBS 12 with which the UE currently has one or more communication channels established when starting at position A.

In step S102, the MME 16 acquires data indicating power availability of the five RBSs 11-15 via which the UE is capable of communicating along the path between A and B. In FIG. 4, the acquired data indicating power availability for the third, fourth and fifth RBS 13-15 is illustrated.

The acquired data may constitute historical data indicating the power availability of the respective RBS over time, which data may be held by the MME 16 or some other appropriate device. The power availability over time for the third RBS 13 has been described with reference to FIG. 3 (with and without battery backup).

In this example, it is assumed that the UE 10 approaches the third and fourth RBS 13, 14 just before $t_2$; the UE communicates via second RBS 12 between $t_0$ and $t_1$.

In step S103, the MME 16 will thus determine, from the acquired data indicating power availability, via which RBSs communication is to be established along the expected path for avoiding establishing communication with one or more of the radio base stations indicated to be subjected to power failure, which in its turn will result in communication failure of the UE 10.

With the acquired power availability information, the MME 16 schedules in step S104 the communication of the UE 10 such that when the UE 10 encounters the third and the fourth RBS 13, 14 as time approaches $t_2$, the MME 16 effects a handover of the UE 10 from the second RBS 12 to the fourth RBS 14 since the power availability data of the third RBS 13 indicates that the third RBS 13 will be subjected to a power outage at $t_2$, but that the fourth RBS 14 as this time is up and running.

Advantageously, this avoids any communication failure of the UE 10 attempting to establish a communication channel with the third RBS 13, as previously discussed with reference to FIG. 2.

Further, as the UE 10 travels along the path to its final destination B, the MME 16 concludes from the acquired power availability data and the path information indicating that as the UE 10 moves into communication range of the fifth RBS 15 at around time $t_6$, the MME 16 concludes that a power outage will occur for the fourth RBS 14 at time $t_7$ (with which the UE 10 currently has a channel established) and consequently schedules communication such that the UE 10 is handed over to the fifth RBS 15 at time $t_6$, thereby avoiding communication failure with the fourth RBS 14 at time $t_7$. It should be noted that this may have been determined by the MME 16 already at point A.

As can be concluded from FIG. 4, the UE 10 could have been handed over at $t_7$ to the third RBS 13 in order to avoid communication failure. However, since the UE 10 moves along the path in a direction towards the fifth RBS 15, it is more efficient to hand the UE 10 over to the fifth RBS 15 in order to avoid yet another handover from the third RBS 13 to the fifth RBS 15 as the UE moves out of the cell provided by the third RBS 13.

As previously mentioned, if the UE 10 passes via the third RBS 13 and the UE establishes a communication channel with the third RBS 13 before $t_2$, a communication failure will occur at $t_2$ due to the third RBS 13 suffering from power outage. As a consequence, it will not be possible to re-establish communication with the third RBS 13 until time $t_3$.

As is understood, the MME 16 may acquire updated power availability information as the UE 10 travels along the path and thus continuously re-schedule communication of the UE 10 based on the updated information.

In a further embodiment illustrated with reference to the flowchart of FIG. 5, based on the acquired power availability of the RBSs, a measure reflecting the power availability over time is computed by the MME 16 for each RBS.

As in FIG. 3, the expected path of the UE 10 is determined in step S101, and data indicting power availability of the RSBs are acquired in step S102.

As previously shown with reference to FIG. 2, for the third RBS 13, the MME 16 may in step S102*a* computes the measure P(grid)=0.9999 reflecting that over a given time period, there is a 99.99% probability that the third RBS 13 will not suffer from power failure (and 99.999% in case a backup battery is utilized).

Thereafter, it is again determined via which of the RBSs 11-15 communication is to be established along the expected path for avoiding establishing communication with one or more of the RBSs 11-15 indicated to be subjected to power failure.

However, in this embodiment, the MME 16 determines in step S103' whether or not one or more of the computed measures exceed a threshold value indicating a sufficiently high-power availability.

This may be performed by acquiring the threshold value T from communication requirements stipulated in a Service Level Agreement (SLA) established between the user of the UE 10 and a network operator; if the SLA stipulates that the user of the UE 10 should be guaranteed an RBS power availability of, say, 99.9%, then the above-computed value of 99.99% for the third RBS 13 is sufficient.

If so, the MME 16 will in step S104' not necessarily schedule the communication such that the UE 10 establishes a communication with the fourth RBS 14 as described in hereinabove (even if the fourth RBS 14 would have a higher probability also exceeding T), but could schedule the communication to occur via the third RBS 13.

For instance, there may be indications that too many UEs are scheduled to establish communication with the fourth RBS 14, which may result in communication failure for the UE 10 not due to power outage but due to cell overload.

Figure 5:
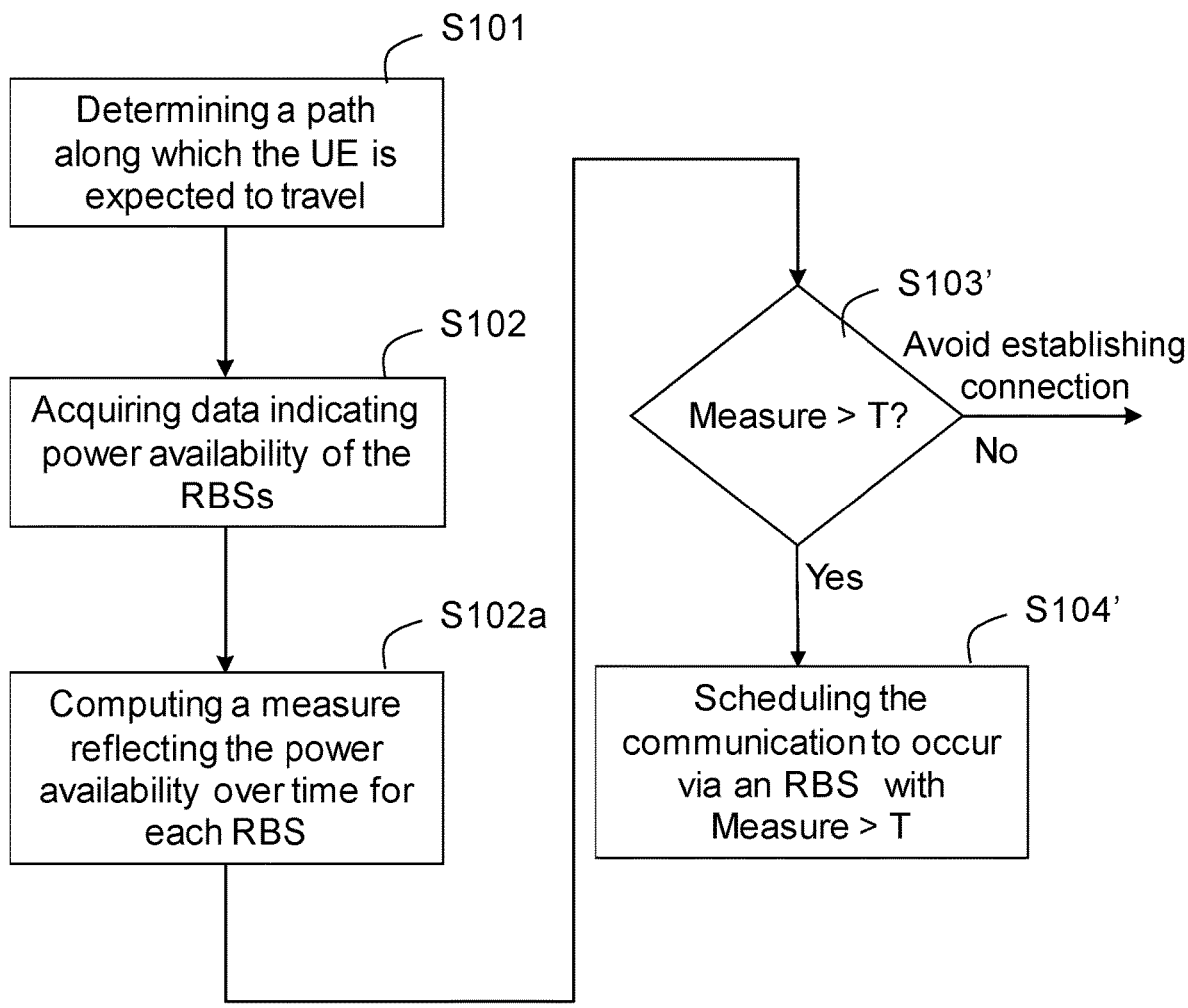
FIG. 5 shows a flowchart illustrating a method of scheduling communication of a wireless communication device in a communications network according to another embodiment.

As shown in FIG. 5, an RBS for which a computed power availability measure does not exceed T may be avoided.

In embodiments, other RBS parameters resulting in UE communication failure are taken into account, such as an expected temporary radio unit failure of one or more of the RBSs. Assuming for instance that the MME 16 acquires historical data indicating that radio unit failure has a tendency of occurring for a given RBS at a particular time of day or week, then that information is taken into account upon scheduling communication for the UE in order to avoid UE communication failure.

It may further be envisaged that quality of radio channels to be established with the RBSs 11-15, such as for instance Quality of Service (QoS), is taken into account upon scheduling communication of the UE 10.

Figure 6:
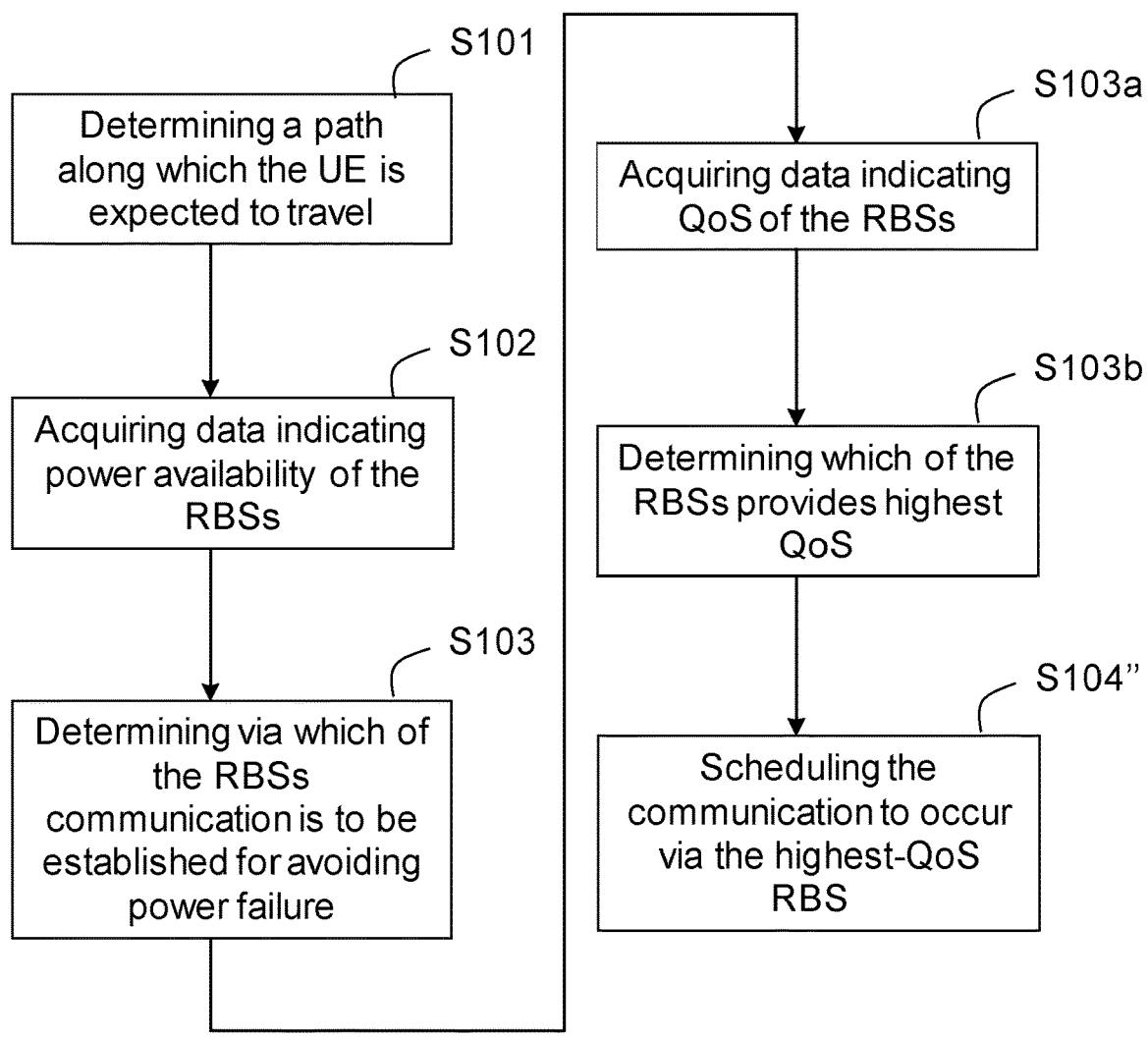
FIG. 6 shows a flowchart illustrating a method of scheduling communication of a wireless communication device in a communications network according to yet another embodiment.

FIG. 6 shows a flowchart illustrating this embodiment. For instance, in case two selectable access points, such as e.g. the third RBS 13 and the fourth RBS 14, is indicated not to be subjected to power failure in an upcoming time period as the UE 10 is approaches the two, the MME 16 will determine which one of the third RBS 13 and the fourth RBS 14 that provides a highest QoS and thus select the one of the two RBSs providing the highest QoS.

Thus, as previously described, an expected geographical travel path for the UE 10 is determined in step S101, power availability data is acquired in step S102, and it is determined in step S103 to which RBS not experience power failure the UE 10 should be connected.

In this embodiment, neither the third RBS nor the fourth RBS 14 is indicated to be subjected to power failure, and the MME 16 will in step S103a acquire data indicating QoS provided by the third RBS and the fourth RBS 14.

In step S103b, it is determined which one of the two provides the highest QoS. Assuming that the third RBS 13 is indicated to provide a higher QoS than the fourth RBS 14; the MME 16 will thus in step S104" schedule the communication of the UE 10 to occur via the third RBS 13.

In a further embodiment, regardless of whether or not QoS is taken into account as in FIG. 6, upon scheduling communication to occur via a particular radio base station such as for instance the third RBS 13, the MME 16 determines if a stipulated service level requirement is complied with, for instance as agreed upon in an SLA.

For example, the MME 16 concludes that packet loss of the third RBS 13 is higher than what is stipulated in the SLA for the UE 10. If so, the MME 16 reconfigures the third RBS such that the degree of packet loss decreases and the requirements of the SLA indeed are complied with, e.g. by assigning more resources to the third RBS or reconfiguring to the third RBS 13 to apply a different modulation in order to reduce the packet loss.

In a further embodiment, the MME 16 is configured to implemented machine-learning (ML) in order to determine from the acquired data indicating power availability of radio base stations via which of the radio base stations communication is to be established along an expected path for avoiding establishing communication with one or more of the radio base stations indicated to be subjected to power failure, and subsequently to schedule the communication to occur via the determined radio base stations (11-15).

Various ML technologies may be used for determining from the acquired data indicating power availability how the UE should be scheduled—and to continuously improve the scheduling decisions taken—such as for instance reinforcement learning, convolutional neural networks, random forests, etc.

Advantageously, from a great amount of relatively impenetrable historical power availability data, the ML component of the MME 16 is capable of determining from the acquired power availability data how to schedule the UE to establish communication with the RBSs in order to avoid being subjected to power failure.

It should be noted that the power availability data may be a combination of power data originating from the power grid and power sources such as solar, wind batteries, fossil fuel. In some countries with limited electricity availability, authorities may provide schedules for predicted power outage such as those discussed with reference to FIGS. 2 and 4.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Figure 7:
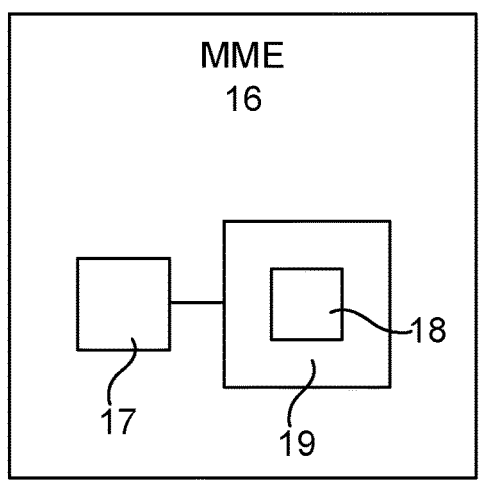
FIG. 7 shows a device performing a method of scheduling communication of a wireless communication device in a communications network according to an embodiment.

FIG. 7 illustrates an MME 16 configure to schedule communicating for a UE. The steps of the method performed by the MME 16 in practice performed by a processing unit 17 embodied in the form of one or more microprocessors arranged to execute a computer program 18 downloaded to a suitable storage volatile medium 19 associated with the microprocessor, such as a Random Access Memory (RAM), or a non-volatile storage medium such as a Flash memory or a hard disk drive. The processing unit 17 is arranged to cause the RBS 20 to carry out the method according to embodiments when the appropriate computer program 18 comprising computer-executable instructions is downloaded to the storage medium 19 and executed by the processing unit 17. The storage medium 19 may also be a computer program product comprising the computer program 18. Alternatively, the computer program 18 may be transferred to the storage medium 19 by means of a suitable computer program product, such as a Digital Versatile Disc (DVD) or a memory stick. As a further alternative, the computer program 18 may be downloaded to the storage medium 19 over a network. The processing unit 17 may alternatively be embodied in the form of a digital signal processor (DSP), an application specific integrated circuit (ASIC), a field-programmable gate array (FPGA), a complex programmable logic device (CPLD), etc.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of a device of scheduling communication of a wireless communication device in a communications network, comprising:
   determining a geographical path along which the wireless communication device is expected to travel;
   acquiring data indicating power availability of access points via which the wireless communication device is capable of communicating along the expected geographical path, wherein the acquired data constitutes historical data indicating power availability of the access points over time and the historical data indicating power availability comprises an expected power outage schedule of the access points over time;
   determining, from the acquired data indicating power availability, via which of the access points communication is to be established along the expected geographical path for avoiding establishing communication with one or more of the access points indicated to be subjected to power failure; and
   scheduling the communication to occur via the determined access points.

2. The method of claim 1, the scheduling being performed such that the wireless communication device is scheduled to establish connection with one of the access points which currently is not subjected to power failure, the wireless communication device being rescheduled from said one of the access points to another of the access points in case a power failure is approaching for said one of the access points.

3. The method of claim 1, further comprising:
   computing, based on the acquired data indicating power availability of the access points, a measure reflecting the power availability over time for each access point.

4. The method of claim 3, the determining via which of the access points communication is to be established comprising:
   determining whether or not one or more of the computed measures exceed a threshold value indicating a sufficiently high power availability, and if so the scheduling comprises:

scheduling the communication to occur via any one of the access points having a computed measure exceeding the threshold value.

5. The method of claim 1, further comprising, in case selection is to be made between two or more access points not being subjected to power failure:
   acquiring data indicating quality of service provided by said two or more access points;
   determining, from the acquired data indicating quality of service, which one of said two or more access points is indicated to provide a highest quality of service; and
   scheduling the communication to occur via the determined access point indicated to provide a highest quality of service.

6. The method of claim 1, further comprising, in case a stipulated service level requirement is indicated to not be complied with by one or more of the determined access points via which communication is scheduled to occur:
   reconfiguring said one or more of the determined access points such that the stipulated service level requirement is complied with.

7. The method of claim 1, the determining and scheduling being based on machine learning.

8. A computer program comprising computer-executable instructions for causing a device to perform steps recited in claim 1 when the computer-executable instructions are executed on a processing unit included in the device.

9. A computer program product comprising a non-transitory computer readable medium, the non-transitory computer readable medium having the computer program according to claim 8 embodied thereon.

10. A device configured to schedule communication of a wireless communication device in a communications network, the device comprising a processing unit and a memory, said memory containing instructions executable by said processing unit, whereby the device is operative to:
    determine a geographical path along which the wireless communication device is expected to travel;
    acquire data indicating power availability of access points via which the wireless communication device is capable of communicating along the expected geographical path, wherein the acquired data constitutes historical data indicating power availability of the access points over time and the historical data indicating power availability comprises an expected power outage schedule of the access points over time;
    determine, from the acquired data indicating power availability, via which of the access points communication is to be established along the expected geographical path for avoiding establishing communication with one or more of the access points indicated to be subjected to power failure; and to
    schedule the communication to occur via the determined access points.

11. The device of claim 10, further being operative to perform the scheduling such that the wireless communication device is scheduled to establish connection with one of the access points which currently is not subjected to power failure, the wireless communication device being rescheduled from said one of the access points to another of the access points in case a power failure is approaching for said one of the access points.

12. The device of claim 10, further being operative to:
    compute, based on the acquired data indicating power availability of the access points, a measure reflecting the power availability over time for each access point.

13. The device of claim 12, further being operative to, when determining via which of the access points communication is to be established:
    determine whether or not one or more of the computed measures exceed a threshold value indicating a sufficiently high power availability, and if so being operative to, when performing the scheduling:
    schedule the communication to occur via any one of the access points having a computed measure exceeding the threshold value.

14. The device of claim 10, further being operative to, in case selection is to be made between two or more access points not being subjected to power failure:
    acquire data indicating quality of service provided by said two or more access points;
    determine, from the acquired data indicating quality of service, which one of said two or more access points is indicated to provide a highest quality of service; and to
    schedule the communication to occur via the determined access point indicated to provide a highest quality of service.

15. The device of claim 10, further being operative to, in case a stipulated service level requirement is indicated to not be complied with by one or more of the determined access points via which communication is scheduled to occur:
    reconfigure said one or more of the determined access points such that the stipulated service level requirement is complied with.

16. The device of claim 10, further being operative to perform the determining and scheduling based on machine learning.

* * * * *